C. S. VAN WAGONER.
Improvement in Shutter-Fasteners.
No. 127,941. Patented June 11, 1872.
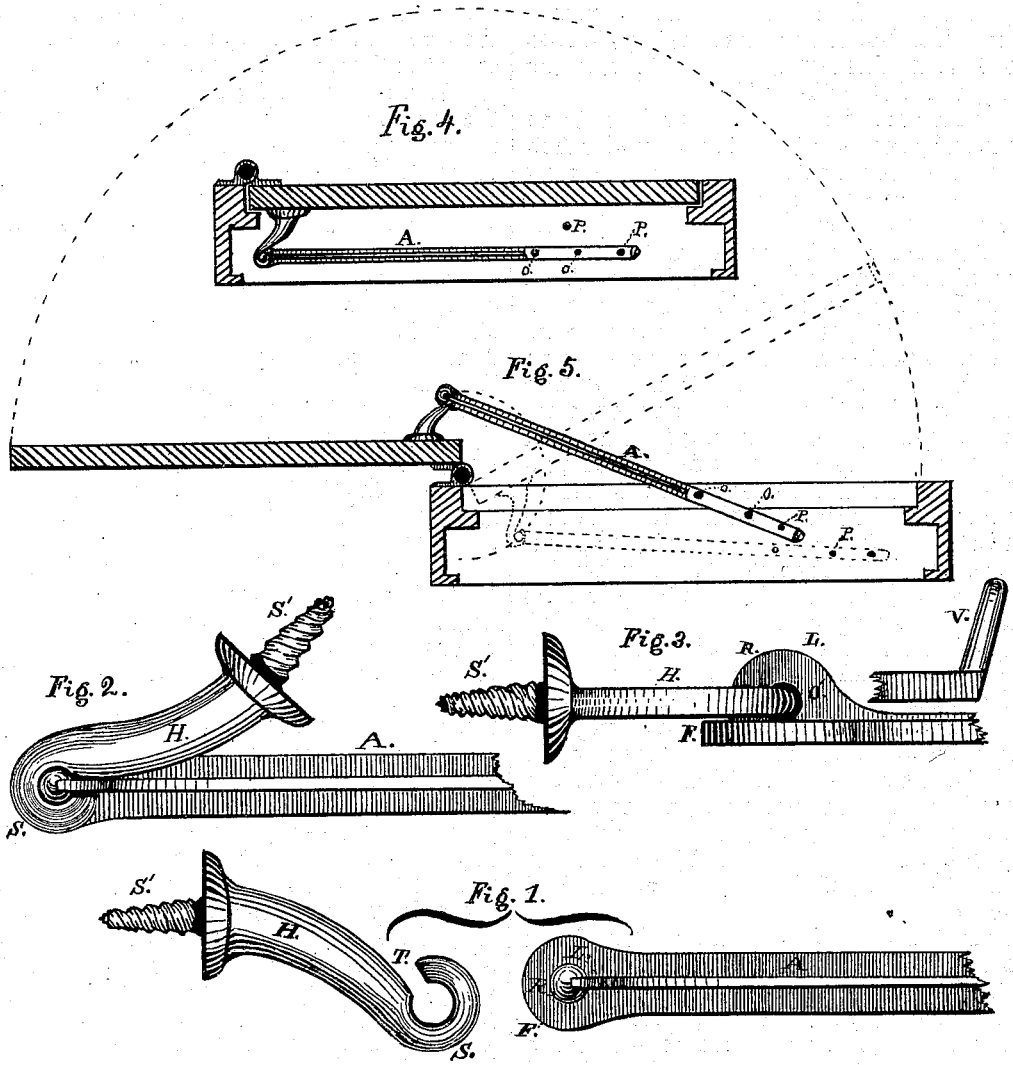

UNITED STATES PATENT OFFICE.

CORNELIUS S. VAN WAGONER, OF NEW YORK, N. Y.

IMPROVEMENT IN SHUTTER-FASTENERS.

Specification forming part of Letters Patent No. 127,941, dated June 11, 1872.

Specification describing certain Improvements in Blind-Fasteners, invented by CORNELIUS S. VAN WAGONER, of New York, in the county and State of New York.

The first part of my invention relates to an improved hook to be screwed or otherwise fastened to the blind, and provided with a narrow slit or entrance-way expanded in the head of the hook into a circular form to receive the loop of the arm rounded at the part in contact, so as to make a reasonably-tight fit. This feature is, however, only claimed when combined with the peculiarly-constructed arm. The second part of my invention relates to an arm, substantially provided with a loop made entirely or continuous with the arm, or, more strictly speaking and describing it in terms of its manufacture, an arm provided with a projecting flange, and bored of a size but a trifle larger than the head of the hook. This arm is provided, in the usual manner of such blind-fasteners, with an upward-projecting handle, V, at the opposite end, also with three or more holes for attaching the same to pins intended to be driven in the window-sill. These two parts are attached together without riveting the loop, being inserted into the hook in such a manner that it is impossible to disengage the connection while the hook is secured to the blind, for the reason that the blind is in the way and prevents the arm swinging far enough round to permit disengagement or detachment. The general purpose of this invention is to permit the fastening of the blind at any desired angle.

Figure 1 is a top view of the hook and arm detached from each other. Fig. 2 is a top view, showing the parts in position for engagement, but not yet engaged. Fig. 3 is a side view of the same engaged or attached to each other. Fig. 4 is a horizontal and partially-sectional view of the blind, window, and blind-fastener, the blind being closed. Fig. 5 is the same open, the dotted lines showing the blind in different positions.

A is the arm. H is the hook. F is the flange of the arm, which assists to hold it in position and prevent it dropping, so as to hang perpendicularly from the hook, or become disengaged when the arm is raised in a vertical position. L is the loop part of the arm, which is continuous with the vertical flange $f'$. P P are pins, inserted in the window-sill, to which the arm A is secured by inserting them in the openings O provided in the far end of the arm A. R is the rounded part of the loop L. S is the socket part of the hook H, which receives the rounded part R of the loop L when these parts are in position for use. T is the slit or narrow strait leading to the socket S, through which the narrow part of the loop L passes when the parts are engaged or disengaged.

One purpose of my invention is to secure cheapness in manufacture. The hook with slit and socket may be cast entire. The arm A may also be cast with the holes for securing it to the window-sill; and the upward-projecting handle and other parts may be cast entire, leaving no handling or tool work to be done, except to bore the hole $o'$, which makes the loop L. The strait T should be made as nearly in line with the length of the hook and screw $s'$ as possible.

When the parts are to be attached to each other they are placed in the relation shown in Fig. 2—the end of the arm A with the loop L underneath the hook in line with the center of the socket S. In this position drop the hook H until the end or point of the hook at the strait T is opposite the orifice $o'$ in the loop L; then turning either the hook H or the arm A the parts will become engaged, and, the hook being screwed into the blind at the proper point, and prevented from turning in any of the usual ways, they cannot be detached from each other, and are ready for use. The flange F under the hook H prevents oscillation of the arm A sidewise, and the outer end of the same, coming in contact with the hook, prevents the arm from dropping into the perpendicular position. The arm A moves freely and horizontally around the hook H, and may also be raised freely at will; but the flange just described prevents it from dropping and falling into a perpendicular position out of reach. The arm A so supported is not likely to come in contact with or scrape against the window-sill. This has been an objection where the arm has been riveted rigidly to the bracket occupying the place of the hook H. The flange F at the side and opposite the rounded portion of the loop L is intended to prevent disengagement of the parts when the arm is raised to the vertical position. Detachment might occur in that case if this part of the flange did not prevent it. The parts might be attached by a horizontal end movement of the arm A toward the hook H, the loop L being in line with the strait T, were it not that the outward portion of the loop L is rounded so as to make a reasonably-tight fit with the socket S when the parts are in position.

Claims.

I claim—

1. The arm A, provided with the loop L, rounded at R.

2. The hook H, provided with a slit or strait, T, opening into the socket S of its head, in combination with the arm A provided with the loop L and the hook, engaging each other.

3. The arm A provided with the loop L, in combination with the flange F, for the purpose set forth.

4. The arm A, provided with the loop L and the flange F, in combination with the hook H, constructed as described.

CORNELIUS SCHOONMAKER VAN WAGONER.

Witnesses:
T. B. MOSHER,
WM. WINTERS.